US009370748B2

(12) United States Patent  
Kilgus

(10) Patent No.: US 9,370,748 B2  
(45) Date of Patent: Jun. 21, 2016

(54) RECESS PLATE AND METHOD FOR DETECTING MEMBRANE LEAKAGE

(71) Applicant: OUTOTEC OYJ, Espoo (FI)

(72) Inventor: Michael Kilgus, Nersingen (DE)

(73) Assignee: Outotec OYJ, Espoo (FI)

( * ) Notice: Subject to any disclaimer, the term of this patent is extended or adjusted under 35 U.S.C. 154(b) by 227 days.

(21) Appl. No.: 14/269,289

(22) Filed: May 5, 2014

(65) Prior Publication Data

US 2014/0311978 A1    Oct. 23, 2014

Related U.S. Application Data

(63) Continuation of application No. PCT/EP2012/071099, filed on Oct. 25, 2012.

(30) Foreign Application Priority Data

Nov. 10, 2011 (EP) .................................. 11188604

(51) Int. Cl.
| B01D 25/133 | (2006.01) |
| B01D 65/10 | (2006.01) |
| B01D 24/46 | (2006.01) |
| B01D 35/143 | (2006.01) |
| B01D 25/12 | (2006.01) |
| B01D 25/28 | (2006.01) |
| B01D 65/02 | (2006.01) |

(52) U.S. Cl.
CPC .......... *B01D 65/104* (2013.01); *B01D 24/4657* (2013.01); *B01D 25/12* (2013.01); *B01D 25/282* (2013.01); *B01D 25/285* (2013.01); *B01D 35/143* (2013.01); *B01D 65/02* (2013.01); *B01D 2201/202* (2013.01)

(58) Field of Classification Search
None
See application file for complete search history.

(56) References Cited

U.S. PATENT DOCUMENTS

| 3,656,622 A |   | 4/1972 | Heimbach et al. |  |
| 3,812,971 A | * | 5/1974 | Yamamoto | B01D 33/0025 100/159 |
| 4,251,373 A | * | 2/1981 | Nakamura | B01D 25/215 210/225 |
| 4,666,596 A | * | 5/1987 | Oelbermann | B01D 25/215 100/194 |
| 4,844,803 A | * | 7/1989 | Urech | B01D 36/001 100/115 |
| 4,964,986 A | * | 10/1990 | Davis | B01D 25/215 210/231 |

(Continued)

FOREIGN PATENT DOCUMENTS

| DE | 29916427 U1 | 1/2000 |
| DE | 20307912 U1 | 10/2003 |

(Continued)

*Primary Examiner* — Krishnan S Menon
(74) *Attorney, Agent, or Firm* — Von Rohrscheidt Patents

(57) ABSTRACT

The invention relates to a recess plate for a membrane filter device, the filter device having a stack of essentially identical recess plates, the recess plates having recesses, and the recesses forming filter chambers between adjacent recess plates of the stack, into which filter chambers a suspension can be supplied on a cake side of the filter cloth, and the suspension can permeate the filter cloth to a filtrate side thereof, such that a solid content of the suspension deposits on the filter cloth as a filter cake, each filter chamber having a moveable membrane, the membrane and the recess plate enclosing a squeezing chamber, the recess plate having an inlet duct for inserting a pressurizing medium into the squeezing chamber, for mechanical pressing out the respective filter cake. The invention further relates to a method for detecting membrane leakage in such membrane filter device.

9 Claims, 2 Drawing Sheets

(56) References Cited

U.S. PATENT DOCUMENTS

| | | | | |
|---|---|---|---|---|
| 5,152,213 A | * | 10/1992 | Masumoto | B01D 29/01 100/116 |
| 6,180,002 B1 | * | 1/2001 | Higgins | B01D 25/215 100/211 |
| 2009/0008316 A1 | * | 1/2009 | Verhaeghe | B01D 25/26 210/230 |
| 2014/0311978 A1 | * | 10/2014 | Kilgus | B01D 35/143 210/636 |

FOREIGN PATENT DOCUMENTS

| JP | 9155112 A | 6/1997 |
|---|---|---|
| JP | 10296009 A | 11/1998 |

* cited by examiner

RECESS PLATE AND METHOD FOR DETECTING MEMBRANE LEAKAGE

RELATED APPLICATIONS

This application is a continuation of International patent application PCT/EP2012/071099 filed on Oct. 25, 2012 claiming priority from European patent application EP 111 886 04.0 filed on Nov. 10, 2011. Both of which are incorporated in their entirety by this reference.

FIELD OF THE INVENTION

The invention relates in general to filtering and in particular to a method for detecting membrane leakage and to a recess plate.

BACKGROUND OF THE INVENTION

A filter device with a plurality of recess plates configured as plate stacks and filter chambers, which are respectively configured between adjacent recess plates of the stack, is known from U.S. Pat. No. 4,844,803 A. In the filter chambers, substantially in the respective separation plane between the recess plate and the associated counter plate, one or two filter cloths and a rubber elastic membrane are disposed depending on the configuration of the filter device. During filtering operations of the known filter device, the filter chambers are supplied through filling shoes with the pressurized suspension, which is to be filtered, and the suspension is pressed through the filter cloths. Thus, the solid content of the suspension is deposited on the filter cloth as a filter cake. The filtered suspension from which the solid content is purged flows out from the filter chambers as a filtrate below the filter cloth substantially without pressure.

After filtration, the one or two movable membranes are acted on by pressurized air or another gaseous medium at a gas pressure between 4 to 16 bar. Whenever a leakage occurs in one of the membranes of the known filter device, the pressurizing medium percolates into the cake side and discharges unperceived from the filter device together with the filtrate. Where the leakage as such may easily be recognized by monitoring the fluid flow of the pressurizing medium supplied to the filter device, it is merely impossible to identify the actually affected membrane, in particular where the filter device has a large number of filter chambers.

Methods and devices for detecting a leaking membrane are suggested in DE 299 16 427 U1 and in DE 203 07 912 U1: For each filter chamber, a fluid flow sensor is inserted into the duct for the pressurizing medium. In case the pressurizing medium still flows into a chamber, where it has stopped flowing into the others, a leakage of the respective chamber and its membrane is detected.

During squeezing the filter cakes of the known filter devices, values of fluid flow of the pressurizing medium into the respective squeezing chambers spread over a large interval due to decrease in pressure over the common feed pipe outside the filter chambers, due to heterogeneous load of solid content inside the chambers or due to soiling of the respective ducts. Monitoring the fluid flows thus leads to false positive detection of leaking membranes or, more important, to missing actual leakages.

JP 10 296009 A discloses a device and method for the determination of leaks in membrane filter plates, relying on the determination of a leak flow. It suggests a shut-off valve by means of which the pressure chamber can be closed so that no further pressure fluid can enter the chamber.

BRIEF SUMMARY OF THE INVENTION

Thus it is an object of the invention to suggest another method and device for detecting a leaking membrane that avoids the drawbacks of the known art.

The object is achieved by a recess plate for a membrane filter device, the filter device having a stack of essentially identical recess plates, the recess plates having recesses, and the recesses forming filter chambers between adjacent recess plates of the stack, into which filter chambers a suspension can be supplied on a cake side of a filter cloth, and the suspension can permeate the filter cloth to a filtrate side thereof, such that a solid content of the suspension deposits on the filter cloth as a filter cake, each filter chamber having a movable membrane, the membrane and the recess plate enclosing a squeezing chamber, the recess plate having an inlet duct for introducing a pressurizing medium into the squeezing chamber, for pressing the respective filter cake out mechanically.

Improving upon on the methods described in the background of the invention, this object is achieved for each of the filter chambers by supplying the pressurizing medium into the respective squeezing chamber, after supplying the pressurizing medium closing tight the respective inlet duct, monitoring a pressure inside the squeezing chamber and considering a decrease detected in the pressure as evidence for a leakage of the respective membrane. After shutting the duct and monitoring the pressure of the pressurizing medium inside the squeezing chamber rather than its fluid flow, a decreasing pressure indicates leakage of a respective chamber and its membrane.

The method according to the invention may be equally applied in filter devices having one or two filter cloths per filter chamber as well as in filter devices using gaseous or fluid pressurizing media. In particular, water, palm oil or sulfuric acid may equally be applied as pressurizing media.

The method according to the invention may further be equally applied separate from a filtering process, in an empty state of the filter chambers, or it may be applied while squeezing out the filter cake after the filtering process.

Currently, squeezing pressure (and pressure for detecting membrane leakage) is known to be applicable from 4 up to 30 bar. However, even higher pressure may be applied with future filter devices. In particular, high squeezing pressure is applied in filter devices having the membranes welded to the recess plates. Filter devices having replaceable membranes clamped or screwed to the recess plates are usually charged with lower squeezing pressures.

Advantageously, according to a method according to the invention, the membrane leakage is detected in case the pressure decreases at a rate exceeding a fixed value. As the squeezing chambers can easily be pressurized to a common level, a common maximum rate of decrease in pressure can be defined for all squeezing chambers. This common fixed value greatly simplifies adjusting the related measuring, indicating and signaling devices.

Advantageously, the value is fixed by statistical analysis of pressure data from monitoring a multitude of the squeezing chambers. Monitoring multiple squeezing chambers and statistical analysis provides for automatic setting of the value. The fixed value may further be set by use of an expert system based on previously monitored pressure data.

Based on the recess plates described supra the object is achieved by providing a shut-off valve for shutting the duct and a measuring device for measuring pressure inside the squeezing chamber. Such recess plate allows execution of a method according to the invention and features the advantages of the method mentioned above.

Advantageously, within the recess plate according to the invention, the measuring device is arranged in the duct. In the duct, the measuring device is not exposed to the suspension, thus avoiding the measuring device being soiled and shortened in function.

Advantageously, the measuring device is integrated with the shut-off valve.

Integration of the shut-off valve with the measuring device provides for easy retrofitting and quick replacement of the common item.

In an advantageous embodiment of a recess plate according to the invention, an indicator for indicating the pressure inside the squeezing chamber is provided, the indicator being visible while the recess plate being mounted into the stack. Such indicator provides for easy reading pressure data measured inside the squeezing chamber from outside the filter device.

In a further advantageous embodiment of a recess plate according to the invention, a signaling device for signaling a membrane leakage, in case the measuring device measures a decrease of the pressure. Such signaling device provides for quick visual selection of a recess plate having a leaking membrane. The signaling device may e.g. have an acoustic element or show a signal color or warning light for signaling leakage.

Advantageously, a recess plate according to the invention has a transmission element for transmitting pressure data measured by the measuring device to a common pressure monitoring device of the filter device. Such transmission element and common monitoring device provides for automatic monitoring for membrane leakage as well as for keeping records and statistical analysis of pressure data for quality control.

BRIEF DESCRIPTION OF THE DRAWINGS

The method according to the invention and the associated device are subsequently described in more detail with reference to advantageous embodiments illustrated in the drawing figure, wherein.

DETAILED DESCRIPTION OF THE INVENTION

Figure 1:
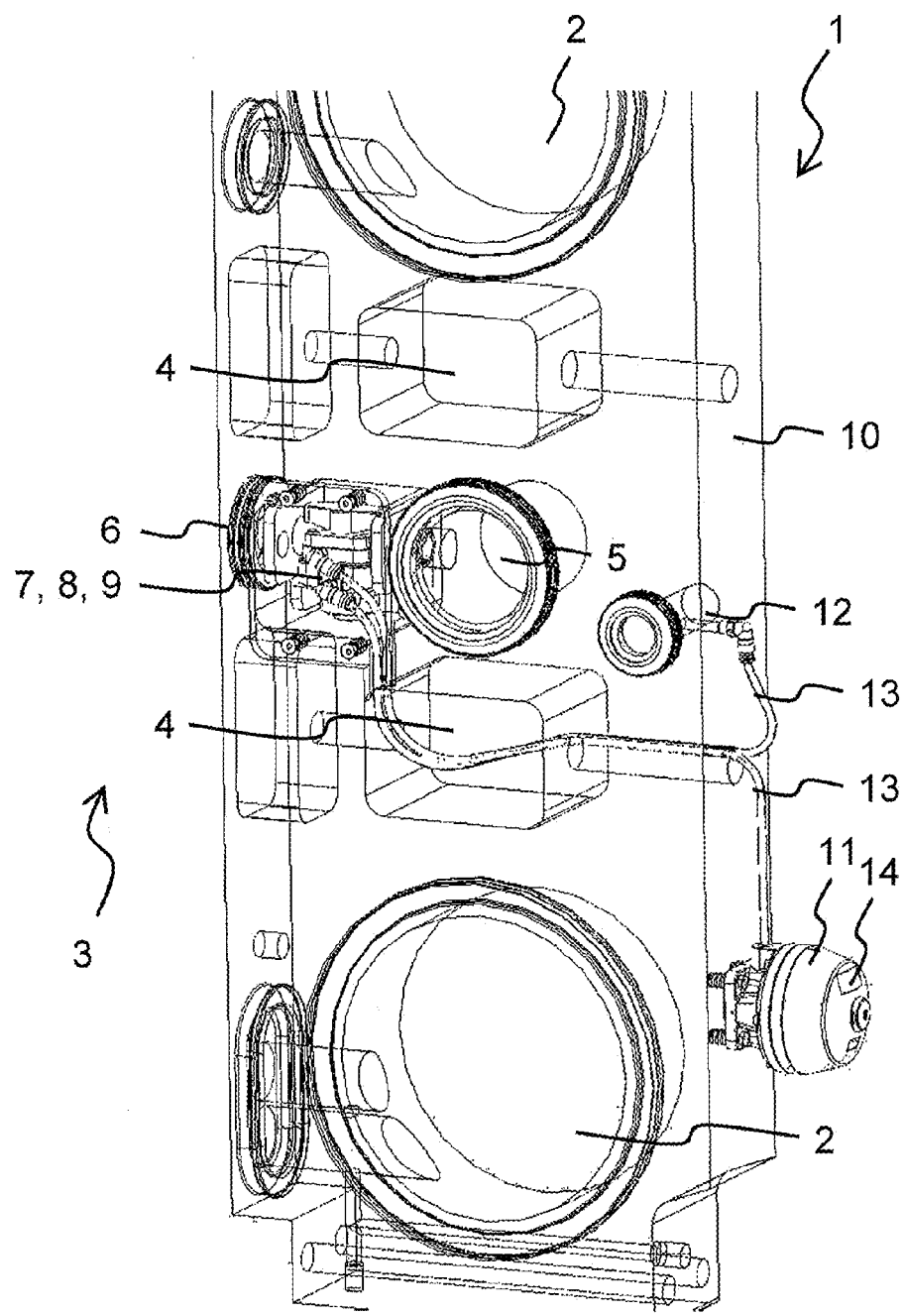
FIG. 1 illustrates the attachment component 1 of a recess plate (not shown) according to the invention.
Figure 2:
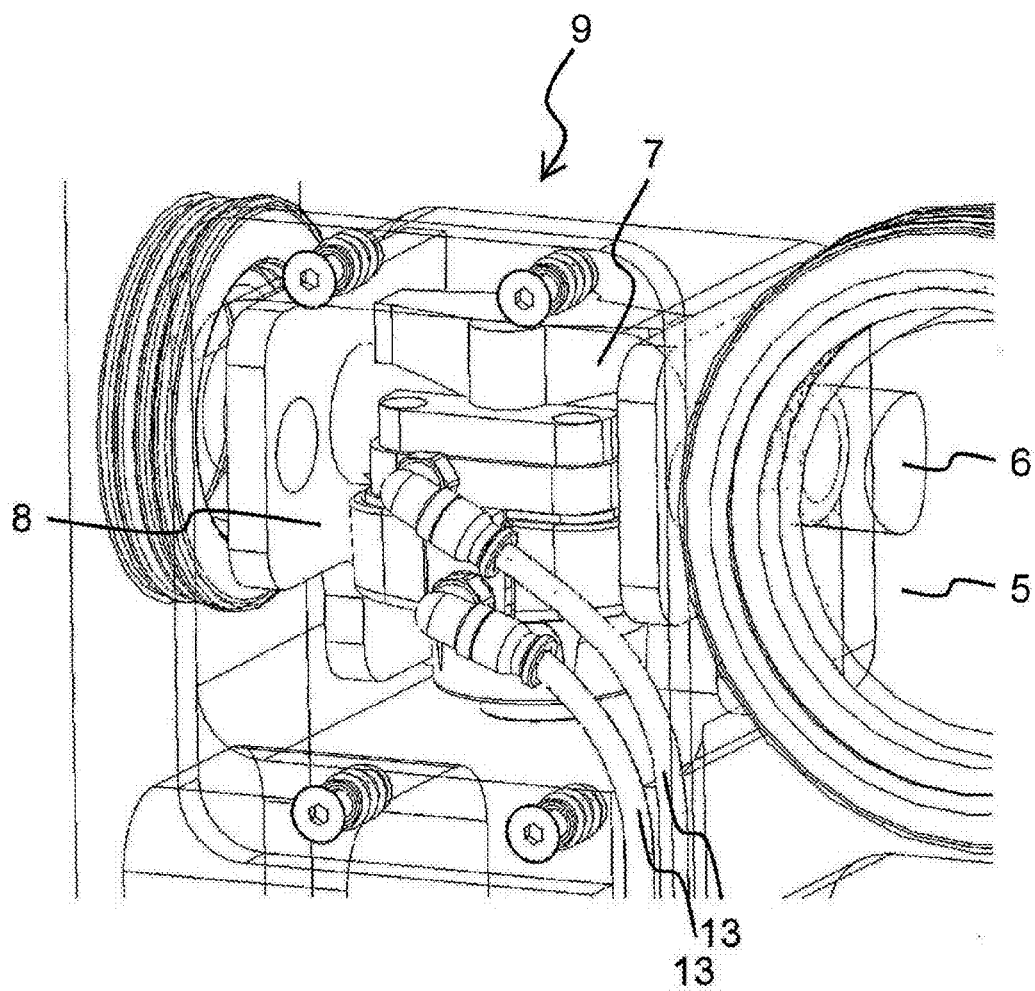
FIG. 2 shows a detail of the same attachment component 1.

In the attachment component 1, the recess plate has two filtrate channels 2, forming two filtrate pipes together with filtrate channels of further such recess plates inside a stack of recess plates in a filter device. Through the filtrate pipe, the filtrate is discharged from a filter chamber 3, formed between the recess plate and an adjacent recess plate of the stack (filtrate pipe, additional recess plates, stack and filter device not shown).

The attachment component 1 is connected to a main component of the recess plate by screws (main component and screws not shown) guided by through-holes 4 formed in the attachment component 1. The recess plate is split into main component and attachment components 1 at two sides in order to overcome a restriction in size defined by common molding presses used for manufacturing recess plates. Of course, the invention is not restricted to recess plates assembled from main components and attachment components, but may also be applied with recess plates molded in one.

Further in the attachment component 1, the recess plate has one pressurizing channel 5, forming a pressurizing pipe together with pressurizing channels 5 of the further recess plates (pressurizing pipe not shown). Through the pressurizing pipe and an inlet duct 6, the pressurizing medium is supplied into the squeezing chamber (not shown).

The filtrate pipes, the pressurizing pipe as well as suspension channels (not shown) of the filter device are each formed by corresponding channels (namely the filtrate channels 2, the pressurizing channels 5 and further suspension channels, the latter not shown) are shaped into the attachment component 1 and into another attachment component (not shown) at the opposite side of the recess plate. The filtrate pipes, pressurizing pipes and suspension channels are thus in existence only while the recess plates are stacked and interrupted while the recess plates are separated e.g. for discharging the filter cake from the filter chambers 3.

The recess plate has a shut-off valve 7 for shutting the inlet duct 6 as well as a measuring device 8 for measuring a pressure inside the squeezing chamber. The shut-off valve 7 and the measuring device 8 are integrated into one valve cartridge 9 that is provided as in integral spare or retrofitting component for the recess plate. At its outer visible edge 10, the recess plate has a signaling device 11 for signaling a membrane leakage. Both the valve cartridge 9 and the signaling device 11 are driven by pressurized air, supplied through a separate control channel 12, forming a control pipe (not shown) and flexible tubes 13.

For checking for possible membrane leakages, prior to operation with the suspension, the squeezing chambers of the stacked recess plates are automatically supplied with compressed air as pressurizing medium through the pressurizing pipe. After pressure inside the pressurizing channel 5 reaches a steady state, pressurized air is supplied to the valve cartridges 9 through the control pipe for closing the shut-off valves 7.

The signaling device 11 is connected to the squeezing chamber and exposed to the pressure inside the squeezing chamber. While exposed to the pressure supplied from the pressurizing pipe, a display 14 shows a green signal. Where the pressure decreases below a fixed critical value, the display 14 switches from green to red and the signaling device 11 emits an audible beep for signaling leakage of the membrane.

REFERENCE NUMERALS AND DESIGNATIONS 1 attachment component
2 filtrate channels
3 filter chamber
4 through-hole
5 pressurizing channel
6 inlet duct
7 shut-off valve
8 measuring device
9 valve cartridge
10 edge
11 signaling device
12 control channel
13 tube
14 display

What is claimed is:

1. A method for detecting a membrane leakage in a membrane filter device,
   wherein a membrane filter device includes a stack of adjacent essentially identical recess plates,
   wherein the adjacent recess plates include recesses and the recesses form filter chambers between the adjacent recess plates of the stack,
   wherein a suspension is supplied into the filter chambers on a cake side of a filter cloth,
   wherein the suspension permeates the filter cloth to a filtrate side of the filter cloth, so that a solid content of the suspension deposits on the filter cloth as a filter cake,
   wherein each filter chamber includes a movable membrane,
   wherein the membrane and the recess plate enclose a squeezing chamber,
   wherein the recess plate includes an inlet duct for introducing a pressurizing medium into the squeezing chamber for pressing respective filter cake out mechanically, the method comprising the steps:
   for each of the filter chambers supplying the pressurizing medium into the respective squeezing chamber;
   after supplying the pressurizing medium closing the respective inlet duct tight, monitoring a pressure inside the squeezing chamber; and
   detecting a decrease in the pressure as evidence for a leakage of the membrane.

2. The method according to claim 1, wherein the leakage of the membrane is detected when the pressure decreases at a rate exceeding a fixed value.

3. The method according to claim 2, wherein the value is defined by statistical analysis of pressure data from monitoring a multitude of the squeezing chambers.

4. The method according to claim 1, wherein the filter device includes a measuring device for measuring pressure inside the squeezing chamber.

5. The method according to claim 4, wherein the measuring device is integrated with the shut-off valve.

6. The method according to claim 1,
   wherein an indicator for indicating the pressure is arranged inside the squeezing chamber,
   wherein the indicator is visible while the recess plate is mounted into the stack.

7. The method according to claim 4, wherein the filter device includes a signaling device for signaling a membrane leakage when the measuring device measures a decrease of the pressure.

8. The recess plate according to claim 7, wherein the signaling device includes an acoustic element for signaling the leakage.

9. The method according to claim 4, wherein the filter device includes a transmission element for transmitting pressure data measured by the measuring device to a common pressure monitoring device of the filter device.

* * * * *